United States Patent

Auchter-Krummel et al.

[11] Patent Number: 5,837,025
[45] Date of Patent: Nov. 17, 1998

[54] METHOD OF PRODUCING FINE-PARTICLE MULTICOMPONENT GLASS POWDERS FOR USE AS A GLASS FLOW FOR PRODUCING LAYERS AND DECORATIONS ON GLASS, GLASS CERAMIC OR CERAMIC

[75] Inventors: Petra Auchter-Krummel, Vendersheim; Waldemar Weinberg, Seibersbach; Christoph Lesniak, Saarbrücken; Rüdiger Nass, Riegelsberg; Helmut Schmidt, Saarbrücken-Güdingen; Nanning Arfsten, Ockenheim, all of Germany

[73] Assignee: Schott Glaswerke, Mainz, Germany

[21] Appl. No.: 660,178

[22] Filed: Jun. 3, 1996

[30] Foreign Application Priority Data

Jun. 3, 1995 [DE] Germany ............... 195 20 448.4

[51] Int. Cl.$^6$ ............... C03B 9/00; C03B 19/00; C03B 23/00; C03B 37/00
[52] U.S. Cl. ............... 65/21.1; 501/12; 65/17.2; 65/901; 423/266
[58] Field of Search ............... 65/17.2, 21.1, 65/901; 501/12

[56] References Cited

U.S. PATENT DOCUMENTS

| 4,927,560 | 5/1990 | Osaka et al. ............... 252/315.1 |
| 4,981,819 | 1/1991 | Rinn ............... 501/12 |
| 4,999,323 | 3/1991 | Sang et al. ............... 501/103 |

FOREIGN PATENT DOCUMENTS

| 2543530 | 10/1984 | France . |
| 2643895 | 9/1990 | France . |
| 2647775 | 12/1990 | France . |
| 4118185 | 12/1992 | Germany . |
| 4212633 | 10/1993 | Germany . |
| A-07075728 | 3/1995 | Japan . |
| WO92/21611 | 12/1992 | WIPO . |

Primary Examiner—Donald E. Czaja
Assistant Examiner—Jacqueline A. Ruller
Attorney, Agent, or Firm—Walter Ottesen

[57] ABSTRACT

The invention is directed to a method for producing low sintering fine-particle multicomponent glass powder having a particle size of the primary particle in the nanometer range. The method utilizes microemulsion techniques with subsequent separation of the particles out of the emulsion and calcination for utilization as glass flow having a sintering temperature <900° C. or in a glass flow, for generating thin transparent layers or for generating color decorations on glass, glass ceramic or ceramic substrates after adding a coloring pigment to the glass flow. The microemulsion for producing the nanoscale glass powder particles is generated from a nonionic ambiphilic emulsifier with a component of 10 to 15 percent by weight on the emulsion, from an oil phase having a portion of 50 to 70 percent by weight and a glass precursor-containing aqueous salt solution having a portion of up to 31.3 percent by weight with salt contents of up to 45 percent by weight.

17 Claims, 1 Drawing Sheet

Dilatometer Curve of System I
Comparison of Nanopowder to Standard Powder

Dilatometer Curve of System I
Comparison of Nanopowder to Standard Powder

Dilatometer Curve of System II
Comparison of Nanopowder to Standard Powder

METHOD OF PRODUCING FINE-PARTICLE MULTICOMPONENT GLASS POWDERS FOR USE AS A GLASS FLOW FOR PRODUCING LAYERS AND DECORATIONS ON GLASS, GLASS CERAMIC OR CERAMIC

FIELD OF THE INVENTION

The invention relates to a method for producing low-sintering, fine-particle multicomponent glass powders wherein the particle size of the primary particles is in the nanometer range. The method utilizes microemulsion techniques with a subsequent separation of the particles out of the emulsion and calcination. The glass powder is used as a glass flow having a sintering temperature <900° C. or is used in a glass flow for producing thin transparent layers or, after mixing a color pigment to the glass flow, is also used for producing color decorations on glass, glass ceramic or ceramic substrates.

BACKGROUND OF THE INVENTION

A desired reduction of the sintering temperature via a variation of the composition is not always possible so that another path must be pursued. It is known that the sintering temperature required for densification is, inter alia, also a function of particle size. This applies to ceramic particles as well as glass particles. However, different sintering mechanisms are present for the two classes of material.

Densification takes place in ceramic particles primarily via surface and volume diffusion. The ratio of the particle boundary surface to the particle volume increases with decreasing particle size so that a relative increase of defect volume can be observed so that the diffusion rate increases by several powers of ten. The sintering temperature can therefore be reduced by several hundred degrees Celsius by utilizing nanoscale particles.

In glass powders, the densification takes place via the mechanism of the viscous flow. Basically, all glasses can be densely sintered at temperatures about the range of the transformation temperature $T_g$. However, the speed of the material transport is very low because of the high viscosity at $T_g$ so that pores are closed only very slowly. Since the pore size, inter alia, is dependent upon the particle size, when utilizing glass powders in the nanoscale range, the necessary transport paths are considerably shortened so that even at low temperatures, a rapid densification can be obtained. This assumes that a good packing density of the particles is present. The particle size therefore has an indirect influence for the glass powders in contrast to the ceramic particles. To realize low sintering temperatures for glasses, this however means that not only the particle size must be reduced into the nanometer range but also a suitable method for manufacture of this new material class must be developed. The access to such powders requires a new production path since they cannot be obtained via today's conventional methods.

According to the state of the art, finely dispersed glass powders are today produced as will be explained below in (a) and (b).

(a) A glass having the desired end composition is melted and thereafter comminuted and pulverized. This process must, in general, be repeated several times in order to obtain the quality required for the further processing. The sintering activity of the ground materials is mostly low because the small grain sizes, which are required for obtaining significantly reduced sintering temperatures, are realized with grinding processes only with considerable complexity, if at all. A further important aspect in this context is that contamination (dust) can be introduced into the powder during the protracted grinding processes. This contamination operates negatively on the material characteristics.

(b) Chemical syntheses such as the sol-gel processes are an alternative to this conventional method. In the sol-gel processes, glass powder of high homogeneity and sintering activity can be produced from molecular or colloidal dispersive precursors. This so-called gel powder comprises agglomerates of nanoscale primary particles which are comminuted down into the sub-$\mu$m range after a partial thermal densification. For gel powders, the grinding process requires only short process times and the dust is very slight. However, it is a disadvantage that solid agglomerates of nanoscale primary particles remain after grinding. These solid agglomerates cannot be broken down to the original particle size.

During the production of sintered bodies from these powders, a densification of the nanoparticles in these agglomerates is observed first at lower temperatures than for conventional fine glass because here, the diffusion paths are the shortest. A large portion of the original sintering activity is, however, lost because of the coarser particles which occur thereby. In the further course of sintering, significantly higher temperatures are therefore required since the diffusion paths become longer because of this "particle coarsening". For the production of low sintering glass powders, this means that methods for synthesizing powder must be applied with which fine-scale and agglomerate-controlled powders can be obtained because, only in this case, the occurrence of agglomerates in the shaped and dried body (this body is a body after drying and before firing) can be substantially prevented so that the above-described two-stage sintering does not occur.

From the production of ceramic nanoscale powders, it is known that agglomerate-controlled nanoscale powders can be produced via a variation of the sol-gel process, namely, the microemulsion technique. In this method, the particle growth is limited to the nanometer range by utilizing boundary-surface controlling modificators and an agglomeration is prevented, that is, a growing together as in the normal sol-gel process.

Such methods are known, for example, from German published patent applications 4,118,185 and 4,212,633.

DESCRIPTION OF THE INVENTION

Figure 1:
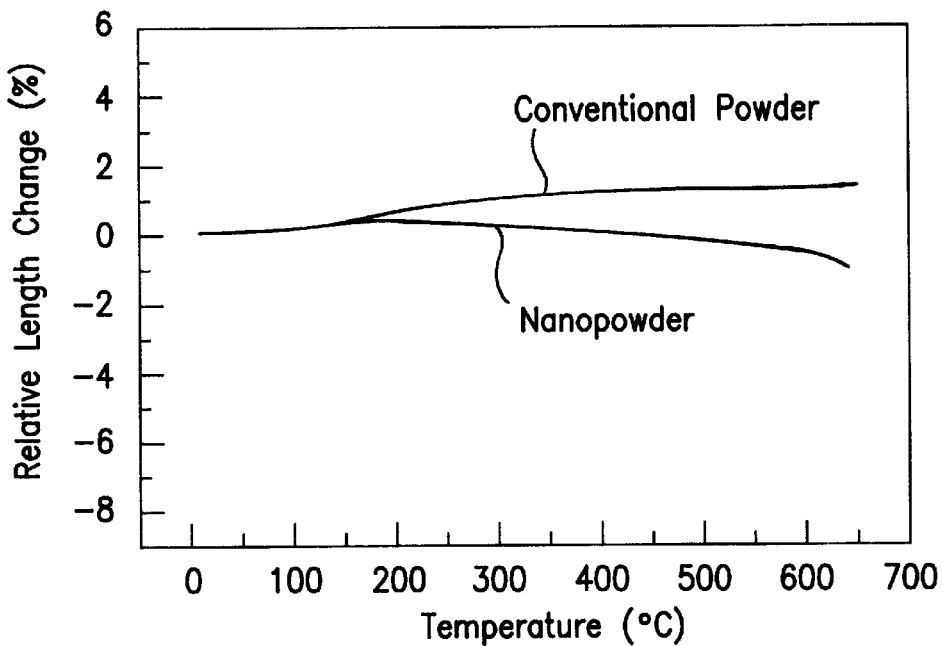
FIG. 1 illustrates the difference between Nanopowder and Standard powder for system I.

In view of the foregoing, it is therefore an object of the invention to produce considerably lower-sintering multi-component glass powders compared to the state of the art. These glass powders can as glass flow easily be applied with conventional methods (such as silk screening) and which can be densified at temperatures of <900° C. to form transparent films adhering to glass, glass ceramic or ceramic substrates. For this purpose, it is also necessary that nanoscale glass powders of a complex composition are obtained which are virtually free of agglomerates and can be redispersed so that the high sintering potential of the nanoparticles is not lost.

The invention is for a method for producing low-sintering fine-particle multicomponent glass powders which have a particle size of the primary particle in the nanometer range. The method utilizes microemulsion techniques with subsequent separation of particles out of the emulsion and calcination. The glass powders are for use as a glass flow having a sintering temperature <900° C. or in a glass flow for generating thin transparent layers, or after admixing of a color pigment to the glass flow, also for producing color decorations on glass substrates, glass-ceramic substrates or ceramic substrates. According to the method, the microemulsion for producing nanoscale glass powder particles is prepared from a nonionic, ambiphilic emulsifier which is 10 to 15 percent by weight portion of the microemulsion; an oil phase which is 50 to 70 percent by weight portion; and, an aqueous salt solution containing glass precursors which is a portion of up to 31.3 percent by weight with the salt solution containing salts up to 45 percent by weight.

An aqueous phase is dispersed in an organic phase with the aid of emulsifiers in this microemulsion technique. In this way, the smallest water droplets occur having a droplet diameters of less than 100 nm which can be used as nanoreactors for the particle synthesis as follows: when the aqueous phase contains, for example, salts, which form the initial material for the particles to be synthesized, then particles can be generated in the droplets via precipitation reactions. For oxidizing particles, precipitation can occur by varying the pH value (adding bases). The formed particles are stabilized by adsorption (physical adsorption and chemical adsorption) by emulsifier molecules present on the boundary surfaces (aqueous phase/organic phase), so that no particle coarsening can occur by coagulation. The particle sizes can be influenced by the synthesis parameters water/oil ratio, nature and concentration of the emulsifier as well as the precursor concentration. The forming particles are, as a rule, amorphous and gelatinous and can be partially predensified by distilling off the excess water.

First, an adaptation of the microemulsion systems and processing techniques to the multicomponent glass powders is necessary.

According to the invention, the glass powders are synthesized from the components $SiO_2$, $Al_2O_3$, $CaO$, $Na_2O$, and $ZnO$ or $B_2O_3$.

The parameters, such as the composition of the organic phase, volume ratios of organic phase to aqueous phase to emulsifier, precipitation conditions, type of emulsifier or calcination conditions were investigated and it was found that a nonionic surfactant of the polyethyleneoxide fatty alcohol type is preferred according to the invention. This emulsifier has, especially, four ethyleneoxide units and a dodecyl residue as aliphatic fatty alcohol.

Further possible nonionic emulsifiers which can be used according to the invention are alkyl phenyl polyglycol ether or fatty acid polyglycerine ester or polyglycol sorbite fatty acid ester. Ionic emulsifiers cannot be used effectively because they react with the cations and separate out.

A central point for the production of microemulsifiers is the use of a suitable emulsifier. Emulsifier molecules are ambiphilically synthesized (hydrophilic and hydrophobic component) and become arranged on the boundary surfaces between oil phase and aqueous phase because of this special configuration and so stabilize the nanoscale water droplets. It is known from the synthesis of ceramic nanoparticles that nonionic emulsifiers are less sensitive with reference to their surface active characteristics than ionic emulsifiers. The HLB-value (hydrophilic-lipophilic balance value) is a variable characteristic of nonionic emulsifiers and is derived from the structure of the emulsifier and defines the emulsifying performance of the surfactant. Nonionic emulsifiers can be selected on the basis of an empirical value, the so-called HLB value.

In the method according to the invention, the best results were obtained when, as an emulsifier, a surfactant having an HLB value in the range of 8 to 12 (especially between 9.6 to 10) was used.

A double bond-free emulsifier is used in a preferred embodiment of the method.

According to the invention, a hydrocarbon having a chain length between C6 and C8 (preferably cyclohexane) is used as the oil phase.

Aliphatic and aromatic hydrocarbons and mixtures thereof such as petroleum ether can generally be used. The boundaries of the chain lengths of the hydrocarbons to be used with the invention lie between $C_5$ and $C_{16}$.

A criterion for the stability of microemulsions is their optical transparency because the nanometer-sized drops, which exist in stable systems, do not scatter visible light. The water drops coalesce in an uncontrolled manner when there is a movement out of the stability range of the microemulsions and water drops occur of micrometer size which cause the system to become turbid.

The systems utilized in accordance with the invention are transparent and stable for an unlimited time utilizing inert gas conditions as well as excluding light. The attainable water content is up to 31.3 percent by weight which is very high.

This high content of aqueous phase permits powder yields which lie approximately at 50 grams/liter which is very high when compared to values from the literature of 2 to 5 grams per liter. This is possible because very high precursor concentrations are present in the aqueous phase. In this connection, salt contents of 40 to 45 percent by weight were realized.

The aqueous phase contains the initial materials (precursors) needed for the multicomponent glasses in a stoichiometric ratio.

The aqueous glass precursor containing solution of the invention includes a silica sol (such as 30 percent by weight of $SiO_2$) and as salts: aluminumnitrate-nonhydrate, calciumnitrate-tetrahydrate, sodium acetate, boric acid and zincnitrate-hexahydrate) to form $SiO_2$, $Al_2O_3$, $CaO$, $Na_2O$, $B_2O_3$ and $ZnO$.

The aqueous precursor-containing phase (content of precursors approximately 42 to 47 percent by weight) is slowly stirred into the solution of nonionic emulsifier (polyethyleneoxide fatty alcohol derivative) in cyclohexane. The temperature is adjusted by thermostating between 15° C. to 40° C. depending upon the HLB-value of the surfactant, especially between 15° C. and 24° C. for surfactants having HLB-values of 10.

The particles are then precipitated by the addition of a base up to approximately pH 10.

For the precipitation of the particles from the emulsion (pH-value approximately 3), sodium hydroxide solution (NaOH) or $NH_3$-gas (ammonia gas) or mixtures of $NH_4^+$ and $NH_3$ (aqueous/ammonia water) or especially mixtures of Na(OH) and $NH_3$ (aqueous ammonia water) up to a pH-value of 8 to 10 (especially up to a value of 8.6 to 8.9) are added to the emulsion.

When water is removed by distillation following the addition of alkaline solution, the microemulsions are no longer stable because of the temperature change. The emulsifier coated nanoparticles aggregate and can be separated by centrifugation. The separated nanopowders are in a gelatinous matrix of emulsifier molecules which protects the individual particles against an agglomeration. A large portion of the emulsifier is, however, only physically adsorbed and is not necessary for agglomeration control. This excess portion must be removed in advance of a calcination because otherwise, carbon remains in the powder. The powders then become black and the carbon cannot be removed even at high temperatures of approximately 900° C. The extraction can be made by successive washings with cyclohexane.

According to the invention, the emulsifier content of the powder formed from the precipitated particles is adjusted to approximately 3 to 6 percent by weight with the aid of the precipitating agent, especially when an aqueous solution of sodium hydroxide (13 n) and a half concentrated ammonia solution is added to the microemulsion.

The precipitating reagent has a considerable influence on the obtainable powder quality.

In unfavorable circumstances, and after isolating the powder and processing, a powder having a high emulsifier content is obtained with approximately 20 percent by weight of emulsifier. This powder cannot flow. In contrast, in an advantageous case, a fluffy flowing powder results with an emulsifier content of approximately 3 to 6 percent by weight. Only the last-mentioned powder can be transferred by calcination into a carbon-free and redispersible powder. The carbon content after emulsifier extraction is therefore a decisive criterion for the selection of the suitable precipitating reagent.

Thereafter, the calcination of the flowable nanoscale emulsifier particles takes place at a maximum temperature of 280° to 300° C. and at slightly oxidized conditions with synthetic air, that is, air having slight oxidizing conditions (furnace atmosphere).

The powders obtained via the microemulsion technique are generally amorphous and have a reduced density because of their gelatinous structure. In addition, these powders have a high number of functional groups (hydroxyl groups) at the surface. Hydroxyl groups are groups via which the individual particles can condense (irreversible agglomeration).

A high powder density (low contraction when drying and sintering) as well as a surface deactivated to the greatest extent possible (low density on functional groups and the tendency to form agglomerates is reduced) is favorable for the processing of the nanoparticles.

For this reason, microemulsion powders are subjected to a thermal aftertreatment (the calcination). During this process, it must be noted that interparticle reactions (condensation) are prevented. For this purpose, a stabilizing barrier is needed which shields the particles from each other at an adequately high temperature in a manner similar to that which occurs in microemulsion. This function is assumed by the emulsifier actively adsorbed (chemisorption) on the nanoparticles. What is decisive is that the emulsifier is resistant to temperature until a deactivation and densification of the particles is obtained. Thereafter, the emulsifier decomposes pyrolitically and a carbon-free white densified weakly agglomerated powder is obtained.

The exact control of important calcination parameters such as gas atmosphere, temperature profile and maximum temperature are therefore decisive for avoiding agglomeration during calcination.

According to the invention, the particles are heated up to a maximum temperature of 280° C. to 380° C. at 3K/min (3° Kelvin per minute) in a slightly oxidizing atmosphere and the maximum temperature is then maintained for sixty minutes.

The particles can be densified virtually free of agglomeration in synthetic air (oxidizing conditions). At the same time, the emulsifier molecules decompose completely. No secondary reactions occur which lead to a local overheating or polymerization in the powder charge.

Lower heatup rates of 3K/min lead to improved results than high heatup rates (>10K/min). It appears that sufficiently long open pores are maintained so that the organic decomposition products can emit gas. It can be observed that at 160° C., the previously white emulsifier coated powder colors brown and the breakdown process of the emulsifier begins. Nitrous gases (nitrate as precursor) escape between 200° C. and 230° C. Starting at 260° C., the powder again becomes brighter and is finally white at 290° C. A holding time of sixty minutes at the maximum temperature guarantees that the organic material is completely pyrolized.

Only nanopowders, which were flowable and emulsifier stabilized in advance of calcination, lead to good calcination results. For a calcination in the presence of synthetic air in thin layers, an adequate ventilation of the powder is guaranteed in order to completely remove the emulsifier. If the heatup rate is not too high (approximately 3K/min), 290° C. are adequate as the maximum temperature. Calcination in layers which are too thick is not suitable because the oxygen partial pressure in the interior of the powder charge drops sharply and reducing conditions prevail which lead to agglomerated powders containing carbon.

According to the invention, chemical compositions of the calcinated powders up to the following in percent by weight are obtained: $SiO_2$ 75; $Al_2O_3$ 15; CaO 10; ZnO 5; $B_2O_3$ 10; $Na_2O$ 15.

Agglomerates of nanoscale primary particles are obtained after the calcination in synthetic air at a maximum of 290° C. In accordance with an estimate from recordings from a high-resolution raster electron microscope, the primary particles have a particle size of 10 to 30 nm. Higher calcination temperatures (>350° C.) cause the nanoparticles to sinter together.

The fine particle multicomponent glass powders can be used as transparent glass flow or pigment-colored glass coloring. To achieve this, the multicomponent glass powders are redispersed in a solution to the primary particle size. This is a precondition for the dense packing of the nanoparticles in the intermediate body via a wet process (for example, silk screening). Only then can low sintering temperatures be realized.

For redispersion, the calcinated powders are placed in a dispersion medium which, if necessary, has additional components (the so-called dispersing agents). These dispersing agents have the task to stabilize the nanoparticles in the dispersed condition. Only then is it possible to obtain intermediate bodies having a high packing density via a suitable forming process. Without stabilization, agglomerations are again formed because of interactions (van-der-Waals forces). The agglomerate formation leads to a defective packing density in the intermediate body so that the transport paths needed for densification are increased which means higher sintering temperatures.

Conventional stabilization methods such as are used for sub-$\mu$m powders (electrostatic stabilization, polymer stabilization), are not advantageous for nanopowders because large equilibrium distances are required between the particles (>5 to 10 nm) and the solid content attainable in the nanoslurry (slurry containing particles of nanometer scale) is very low (<10 percent by volume). Only by using short-chain organic molecules as stabilizers, which permit an equilibrium spacing <1 nm, can the solid content of >30 percent by volume be obtained which is necessary for the silk-screening process.

According to the invention, the nanoscale powder, which is formed from the precipitated and calcinated particles, is suspended and redispersed in pure water especially with succinic acid and citric acid as dispersing agents.

It has been shown that citric acid is the best dispersing agent for the nanoglass powders considered here. However, for each glass composition, another quantity of dispersing agent is required.

This must be determined by simple preliminary experiments.

According to the invention, the suspension, which holds the redispersed particles, is concentrated by removing water especially by means of a vacuum until the particles form a viscous transparent paste especially with a solid content of $\geq 30$ percent by volume. This paste is applied to the substrate in a thin layer especially by spreading or silk screening and is caused to adhere tightly to the substrate via sintering while forming a glaze.

In a preferred embodiment, the paste (especially mixed with silk-screening oil as a silk-screening paste) is applied to the substrate and is likewise tightly bonded to the substrate by sintering.

Figure 2:
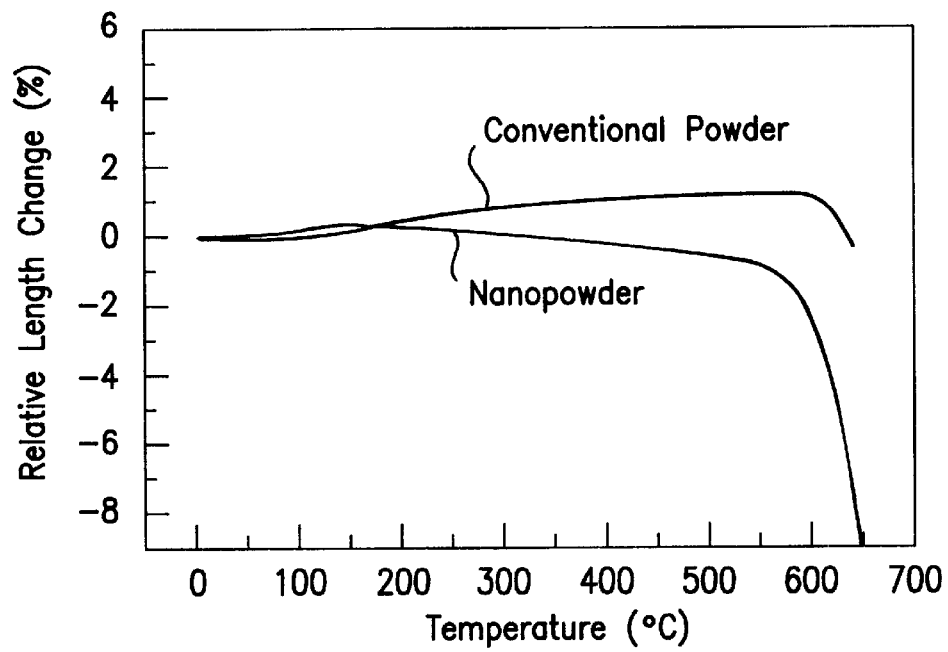
FIG. 2 illustrates the difference between Nanopowder and Standard powder for system II.

The sintering diagrams (FIGS. 1 and 2) show that the nanopowders begin to sinter at lower temperatures than the conventional fine powders. Typical compositions of synthesized powder systems (in percent by weight) are, for example, as follows:

|  | System I | System II |
|---|---|---|
| $SiO_2$ | 68.3 | 71.7 |
| $Al_2O_3$ | 13.7 | 6.9 |
| CaO | 7.2 | 1.9 |
| ZnO | 1.6 | — |
| $B_2O_3$ | — | 8.9 |
| $Na_2O$ | 9.1 | 10.7 |

The invention will now be explained with respect to the two examples which follow.

EXAMPLE I

Synthesis of 100 g glass powder (free of water), System I (containing zinc, computed as water-free glass): 6.84 grams zincnitrate-hexahydrate ($Zn(NO_3)_2 \times 6H_2O$), 218.5 g silica sol (Bayersol 200 S/30, containing 30 percent by weight $SiO_2$), 43.16 g calciumnitrate-tetrahydrate ($Ca(NO_3)_2 \times 6H_2O$) and 20.07 g aluminumnitrate-nonhydrate ($Al(NO_3)_3 \times 9H_2O$) are dissolved in 212.4 g deionized water. This salt solution is carefully stirred into a mixture of 176.6 g Brij 30 (nonionic emulsifier, product name of International Chemical Industry of Great Britain) and 905.1 g cyclohexane whereupon a clear microemulsion is formed at room temperature.

To precipitate the nanoscale particles, first 20 ml of a concentrated sodium hydroxide solution (NaOH content 7.74 g) are added whereby the pH value increases to approximately 4.3. Thereafter, 40 ml of a 25% ammonia solution are added until the pH value is approximately 8.8. When adding the alkaline solutions, care must be taken that the temperature of the microemulsion does not increase. The clear microemulsion is stirred for approximately two hours. The separation of the particles takes place by heating the reaction mixture on a water separator for approximately five to six hours. A precipitate of powder and excess emulsifier is formed. The residual is decanted and disposed of. The precipitant itself is slurried with a ten-fold quantity of cyclohexane and treated ultrasonically. Thereafter, the suspension is centrifuged and the supernatant is disposed of and the precipitant is again slurried. This operation is repeated until a pourable powder is obtained. The powder is calcinated to densify the glass particles and to remove the excess emulsifier. For this purpose, a thin loose powder charge (approximately 2 to 3 mm) is placed in an oven under synthetic air and heated at a heating rate of 3K/min to 290° C. When this temperature is maintained for an hour, a white glass powder is obtained which can be utilized for manufacturing silk-screen pastes.

EXAMPLE II

Synthesis of 100 g glass powder, System II (containing Boron, computed as water-free glass): 18.65 g boric acid ($H_3BO_3$), 8.00 g calciumnitrate-tetrahydrate ($Ca(NO_3)_2$ and 0.53 g aluminumnitrate-nonhydrate ($Al(NO_3)_3 \times 9H_2O$) are dissolved in 273.00 g silica sol (Bayersol 200S/30). This precursor solution is stirred into a mixture of 360 g Brij 30 (nonionic emulsifier, product name of International Chemical Industry of Great Britain) in 1800 g cyclohexane. For precipitation, 20 ml sodiumhydroxide solution are added (NaOH content 9.03 g) which is followed by the addition of 38 ml 25% ammonia solution. The further synthesis then takes place as in System I.

To produce silk-screen pastes, 10 g of the powders produced with the above-described methods are dispersed in a 10% citric acid solution. Clear colloidal suspensions develop which are concentrated in a vacuum by removing excess water until viscous transparent pastes result.

The pastes produced in accordance with the method described above show no thixotropic characteristics and are spread as a thin layer or by means of silk screening on a glass ceramic carrier. The coated glass ceramic carriers are sintered at normal atmosphere to transparent glasses.

For the above, the following temperature profile is passed through: heating at 3K/min to 500° C., hold for sixty minutes, heating at 3K/min to 900° C., again holding for sixty minutes and thereafter cooling down to room temperature.

The nanoscale multicomponent glass powders obtained in accordance with the invention can also be added to any conventional glass flow or to any color decoration in any mixing ratio in order to adjust specific desired characteristics.

It is understood that the foregoing description is that of the preferred embodiments of the invention and that various changes and modifications may be made thereto without departing from the spirit and scope of the invention as defined in the appended claims.

What is claimed is:

1. A method of producing a low-sintering multicomponent glass powder of nanoscale particles, the method comprising the steps of:

preparing a microemulsion including: a non-ionic, ambiphilic emulsifier which is 10 to 15 percent by weight of said microemulsion; an oil phase which is 50 to 70 percent by weight of said microemulsion; and, aqueous salt solution which is 15 to 31.3 percent by weight of said microemulsion, said aqueous salt solution containing glass precursors and having a salt content of 40 to 45 percent by weight of said salt solution;

adding a precipitating agent to said microemulsion to change the pH value of said microemulsion thereby causing said nanoscale particles to precipitate out of said microemulsion;

thereafter, drying, calcinating and redispersing said particles to form said glass powder; and, selecting at least one of said aqueous salt solution and said precipitating agent to contain sodium ions.

2. The method of claim 1, wherein said glass powder is synthesized from the components $SiO_2$, $Al_2O_3$, CaO, $Na_2O$ and ZnO or $B_2O_3$.

3. The method of claim 1, wherein said emulsifier is a nonionic surfactant.

4. The method of claim 3, wherein said surfactant has a hydrophilic-lipophilic balance value (HLB-value) in the range of 8 to 12.

5. The method of claim 3, wherein said oil phase includes a double bond free emulsifier.

6. The method of claim 1, wherein said oil phase includes a hydrocarbon having a chain length between C6 and C8.

7. The method of claim 1, wherein a silica sol having 30 percent by weight $SiO_2$ is added to said aqueous salt solution containing glass precursors; and, wherein aluminum nitrate-nonhydrate, calcium nitrate tetrahydrate, sodium acetate, boric acid and zinc nitrate-hexahydrate are added to said solution as salts.

8. The method of claim 1, wherein said microemulsion is thermostated between 19° C. and 24° C. for surfactants having HLB values about 10.

9. The method of claim 1, wherein the particles are separated from the microemulsion by changing the pH value of the emulsion.

10. The method of claim 9, wherein sodium hydroxide solution (NaOH), $NH_3$ gas, mixtures of $NH_4^+/NH_3$ (aqueous) or mixtures of $NaOH/NH_3$ (aqueous) up to a pH value of 8 to 10 are added to said emulsion.

11. The method of claim 10, wherein the emulsifier content of the powder formed from the precipitated particles is adjusted to approximately 3 to 6 percent by weight with the aid of the precipitating agent.

12. The method of claim 11, wherein the subsequent calcination of the flowable nanoscale particles, which are still emulsifier stabilized, takes place at a maximum temperature of 280° to 300° C. at slightly oxidized conditions with synthetic air (20 percent by volume $O_2$/80 percent by volume $N_2$).

13. The method of claim 12, wherein heat is applied at 3K/min to the maximum temperature and said maximum temperature is maintained for 60 minutes.

14. The method of claim 1, wherein chemical compositions of the calcinated powders are attained in percent by weight up to:

$SiO_2$ 75; $Al_2O_3$ 15; CaO 10; ZnO 5; $B_2O_3$ 10; $Na_2O$ 15.

15. The method of claim 1, wherein primary particles are produced with a particle size of 10 to 30 nm.

16. The method of claim 3, wherein said emulsifier is a polyethyleneoxide fatty alcohol.

17. The method of claim 16, wherein said polyethyleneoxide fatty alcohol has 4 ethyleneoxide units and a dodecyl residue as aliphatic fatty alcohol.

* * * * *